(12) United States Patent
Nassiri

(10) Patent No.: US 8,036,949 B2
(45) Date of Patent: *Oct. 11, 2011

(54) REAL-TIME, INTERACTIVE, COMPETITIVE METHOD OF ON-LINE AUCTION UTILIZING AN AUCTIONEER

(76) Inventor: Nick Nassiri, El Segundo, CA (US)

( * ) Notice: Subject to any disclaimer, the term of this patent is extended or adjusted under 35 U.S.C. 154(b) by 1326 days.

This patent is subject to a terminal disclaimer.

(21) Appl. No.: 11/361,486

(22) Filed: Feb. 23, 2006

(65) Prior Publication Data

US 2006/0206408 A1  Sep. 14, 2006

Related U.S. Application Data

(63) Continuation of application No. 10/132,970, filed on Apr. 26, 2002, which is a continuation-in-part of application No. 09/715,768, filed on Nov. 15, 2000, now abandoned.

(51) Int. Cl.
*G06Q 40/00* (2006.01)
(52) U.S. Cl. .............. 705/26.3; 705/26.43; 705/26.44
(58) Field of Classification Search .............. 705/37, 705/26.3, 26.43, 26.44
See application file for complete search history.

(56) References Cited

U.S. PATENT DOCUMENTS

| | | | | |
|---|---|---|---|---|
| 6,449,601 B1* | 9/2002 | Friedland et al. | ............... | 705/37 |
| 2001/0029478 A1* | 10/2001 | Laster et al. | ................... | 705/37 |
| 2001/0034697 A1* | 10/2001 | Kaen | ............... | 705/37 |
| 2002/0116320 A1* | 8/2002 | Nassiri | ................... | 705/37 |
| 2003/0126068 A1* | 7/2003 | Hauk et al. | ...................... | 705/37 |
| 2004/0193529 A1* | 9/2004 | Asher et al. | ...................... | 705/37 |
| 2007/0207850 A1* | 9/2007 | Darrah et al. | .................. | 463/20 |

\* cited by examiner

*Primary Examiner* — Jagdish Patel
*Assistant Examiner* — Kevin Poe
(74) *Attorney, Agent, or Firm* — Inskeep IP Group, Inc.

(57) ABSTRACT

The present inventive device provides a new method of real-time, interactive, competitive, live on-line auction using an animated auctioneer. The animated auctioneer initiates the auction, actively solicits bids from the auction participants, acknowledges bids input from auction participants, and moves to close the auction when there is a cessation in bidding. In the course of the auction, the auctioneer audibly and physically promotes the item up for bid, and entices the participants to bid. Participants input bids real-time, competitively and successively in response to the animated auctioneer's solicitations.

13 Claims, 9 Drawing Sheets

REAL-TIME, INTERACTIVE, COMPETITIVE METHOD OF ON-LINE AUCTION UTILIZING AN AUCTIONEER

CROSS-REFERENCE TO RELATED APPLICATIONS

The present application is a continuation of U.S. patent application Ser. No. 10/132,970 filed Apr. 26, 2002, entitled "Real Time Competitive Method of Auction Using AN Auctioneer," incorporated herein by reference, which is a continuation in part of U.S. patent application Ser. No. 09/715,768, filed Nov. 15, 2000 now abandoned, entitled "Live Interactive Method of Electronic Auction," incorporated herein by reference.

FIELD OF THE INVENTION

The present invention relates generally to the field of on-line auctions using a computer network, and more specifically it relates to a real-time, interactive, competitive method of live on-line auction using an animated auctioneer.

COPYRIGHT NOTICE

A portion of the disclosure of this patent document contains material that is subject to copyright protection. The copyright owner has no objection to the reproduction by anyone of the patent document or patent disclosure as it appears in the Patent and Trademark Office, patent file or records, but otherwise reserves all copyright rights whatsoever.

BACKGROUND OF THE INVENTION

It can be appreciated that various methods of auction have been in use for years. Prior to the advent of on-line or Internet auctions, traditional auctions conventionally took the form of a physical gathering of participants assembled together within a specified location; said location being where the goods to be auctioned physically resided. At such traditional auctions, a human auctioneer was the conductor of the auction and the individual responsible for shilling the goods to the auction participants. Incited by the direction of the human auctioneer, bidding was conducted simultaneously, successively and competitively among a group of participants present at the auction site.

As noted above, the presence, participation, and personality of the auctioneer was an essential component that provided the auction its sense of competitiveness and excitement. The auctioneer was responsible for instigating bids from auction participants and increasing the bid amount in succession by cajoling the auction participants, and closing the auction upon a cessation of bidding. Thus, in the traditional auction, the role of the auctioneer was not only essential to the functioning of the auction, but in generating the excitement and enjoyment of the auction participants.

The threat of immediate, rapid-fire, and constant competition from other participants was a key factor in the auction's thrill and in the ability of the auctioneer to drive up the current bid price. Thus, in the traditional form of auction, the threat of immediate, rapid-fire bid input, constant competition, the solicitation and offering of goods by an auctioneer, are essential.

The advent of electronic commerce, the Internet, and its related technologies, dramatically and profoundly changed the nature and the method of the traditional auction. The Internet and its related technologies have liberated the bidder from having to be being physically present at the auction. Likewise, the corollary is that the Internet and its related technologies permit the auction of goods from locations that are geographically remote from the bidders. To state the obvious: the Internet has been instrumental in forging a new electronic marketplace that allows buyers and bidders to unite without regard to the constraints of geographical boundaries.

DESCRIPTION OF THE PRIOR ART

Various methods of "on-line" auctions have flourished via the Internet, and are becoming increasingly common place. The prior art discloses several methods of auction, as follow below.

The prior art discloses letters U.S. Pat. No. 6,449,601 issued to Friedland, et al whereby method for distributing a live auction over the Internet to remote bidders is taught. A human proxy attends the live auction in order to monitor the auction and compose status updates that are distributed to remote bidders via the Internet in real time to allow the remote bidders to follow the auction. Remote bidders may place bids for items that are transmitted via the Internet to the human proxy, who may then submit the bids to the auctioneer, components that facilitate distribution of the live auction over the Internet include: an auction console, an auction sever, collector, redistributor nodes, and client programs. The Friedland method of auction does not disclose a real-time, competitive, rapid-fire exchange of bids among the Internet auction participants, per the method of a traditional auction. Rather, Friedland discloses a method of watching an auction via the Internet whereby a prospective participant must contact the human proxy at the actual auction site to submit a bid to the auction on behalf of said prospective participant.

With reference to Friedland, the method disclosed by Friedland is not an on-line auction as disclosed by the present inventive device. Friedland is a traditional auction at a remote physical location conducted by a human auctioneer. The participants are physically located at the auction site. Additionally, participants may bid from a remote location by emailing an intermediate third party who is located at the remote auction site. With respect to the latter, in essence, the method of Friedland teaches that a participant may watch the auction over the Internet, but to actually participate in the auction, the participant must email the intermediate human proxy at the auction site who in turn submits a bid on the participant's behalf.

The prior art further discloses letters U.S. Pat. No. 5,835, 896, issued to Fischer, et al whereby a system for conducting a multi-person, Internet-based auction without the use of an auctioneer is depicted. The Fisher auction is a software-based application that allows a group of bidders to place bids over a computer or communications network without using an auctioneer. The bids are recorded by the system of the network and the bidders are updated with the current auction status information via electronic mail. The winner is also notified via e-mail. The Fisher method of auction does not comprise an actual auctioneer, per the method of a traditional auction, nor does it disclose a real-time, competitive, rapid-fire exchange of bids among the auction participants, per the method of a traditional auction.

The prior art further discloses Fujisaki U.S. Pat. No. 4,789, 928 that describes an auction transmission information processing system. Several computers are linked by telephone lines and arranged in a hierarchical structure. The dealer and front computers transmit bid signals from auction participants through several layers of front computers to the host.

The system is not capable of accepting products for sale in real-time. Additionally, the Fujisaki method describes an auction where one seller at a time markets to many buyers, and only one transaction may be completed at a time. The Fujisaki method of auction does not comprise an actual auctioneer, per the method of a traditional auction, nor does it disclose a real-time, competitive, rapid-fire exchange of bids among the auction participants, per the method of a traditional auction.

The prior art further discloses Barzilai U.S. Pat. No. 6,012,045 whereby a computer-based method of selling consumer products and consumer services is disclosed. The Barzilai patent utilizes a computer system and a plurality of customer computers interconnected with the computer system via a telecommunications link. The computer system electronically establishes a virtual "electronic showroom" that electronically displays goods and services offered for sale. The computer-based method electronically posts all bids made during the bid period and then the computer accepts the highest bid while excluding bids greater than the lowest high bid from a single bidder. The bidder participates via electronic mail and the winner is notified via electronic mail. The Barzilai method of auction does not comprise an actual auctioneer, per the method of a traditional auction, nor does it disclose a real-time, competitive, rapid-fire exchange of bids among the auction participants, per the method of a traditional auction.

The prior art further discloses Harrington, et al U.S. Pat. No. 6,161,099 whereby a computer-based method of auctioning financial documents is depicted. The Harrington patent is depicted as an apparatus and process for conducting municipal bond auctions, over an electronic network. The auction maintains a web site from which information about bonds to be auctioned can be obtained. A user participates in the auction by accessing the web site via a conventional Internet browser and is led through a sequence of screens that perform the functions of verifying the user's identity, assisting the user in preparing a bid, verifying that the bid conforms to the rules of the auction, displaying to the user during the course of the auction selected bid information regarding bids received and informing the bidder how much time remains in the auction. The user may be given the option of confirming the accuracy of his bid before submitting the bid. The auction is able to review bidding history, determine the winner and notify the winner over the network, and display selected auction results to bidders and observers over the network. The Harrington method of auction does not comprise an actual auctioneer, per the method of a traditional auction, nor does it disclose a real-time, competitive, rapid-fire exchange of bids among the auction participants, per the method of a traditional auction.

The prior art further discloses Ausabel U.S. Pat. No. 6,021,398 whereby a computer-based method of auctioning is depicted using an auctioneer's system and a database driven computer network. The Ausabel auction includes a number of queries and answers, queries from the auctioneer's system to the database, and answers to the queries from the database. The auctioneer's system is capable of making a decision based on the answers from the database for determining whether an auction should continue. If a decision is reached indicating that the auction should continue, at least one message is generated and communicated to a user system carrying that information. If a decision is reached to terminate or not to continue the auction, then a final message is generated to at least one user system. The final message may include the results of the auction. The Ausabel method of auction does not comprise an actual auctioneer, per the method of a traditional auction, nor does it disclose a real-time, competitive, rapid-fire exchange of bids among the auction participants, per the method of a traditional auction.

The synopsis is that the above referenced prior art methods of online auctions, with the sole exception of Friedland, are not conducted by an actual auctioneer who urges the auction participants to bid simultaneously and competitively on an item, and who closed the auction upon a cessation of bidding. Rather, the prior art discloses on-line auctions that function by a static posting of goods for sale; said posting being a predetermined period of time for the auction to begin and end within a defined parameter of time, and whereby prospective buyers may post a corresponding bid for a listed good; said buyer hoping to prevail at the end of the day, or week, or month, in accordance with the parameters set by the seller.

Moreover, the above referenced prior art method primarily disclose electronic messaging as the means to tender and facilitate bids to the auction. Auction participants tender their bids via electronic mail; the "quasi-auctioneer", essentially a database, reads the electronic mail bids and enters them in a database of bids. Upon close of the auction, the winning bidder is likewise notified via electronic mail of the final result.

Serious lapses of time and interaction exist in the foregoing electronic mail based methods, with respect to bid input and recognition. Email is routed back and forth between the bidders and the auction, and lapses further occur to update bidders as to the current price and the availability of the particular item or good. Such methods are not a traditional live auction in the true sense of the word, but rather an electronic method of obtaining a maximum price for a good through a predetermined period of time. The present inventive device recognizes the need for true real-time bid input whereby the bid is input real-time to the auction and recognized instantly by the auctioneer.

While the prior art discloses useful and unique methods of on-line auctions, said auctions nonetheless fail to teach the fundamentals associated with a traditional open auction: a live auction, an auctioneer, real time bid input and acceptance by the auctioneer, and immediate competitive exchange among auction participants.

In contrast, the present inventive device encapsulates the key characteristics of the traditional form of open auction: a live auction, an auctioneer, real-time bid input and acceptance, and the competitive, rapid-fire, real-time interaction of participants, albeit in the medium of an on-line auction.

The main problem with conventional methods of on-line auctions is that none of the forgoing methods teach the traditional method of open auction whereby an auctioneer solicits bids from a plurality of participants who in turn bid real-time openly, competitively, simultaneously, and successively among one another, in response to the actions of the auctioneer.

Another problem with conventional methods of on-line auctions is that they are not truly "live" auctions, though many proffer to be. Rather, the foregoing prior art discloses a series of exchanged electronic messages that occur over time as opposed to an open auction whereby a auctioneer solicits bids from a plurality of participants who in turn bid real-time openly, competitively, simultaneously, an successively among one another. A true live auction is not constrained by artificial "start" and "end" parameters, where participants post a bid within the predetermined time parameter. Rather, the true "live" auction kicks off at a predetermined start time and continues with a frenzy of real-time bidding until a winning bidder prevails.

Another problem with conventional methods of on-line auctions is that they lack the excitement and competition of the traditional method of auction. Participants interact with electronically generated images and numbers, not an auctioneer per say, nor with other auction participants. By way of example: An Ebay auction posting comprises a Jpg of the item for sale, a static posting of the highest current bid, and the option to submit a higher bid. There exists no opportunity to compete real-time with other bidders or to interact with an auctioneer real-time.

Another problem with conventional methods of on-line auctions is that they are inefficient and time consuming to use. One must cross-link between multiple web pages in order to submit a bid, update the bid amount and continually repeat this process to remain fully apprised of the status of an updated bid amount, or other bid input.

In view of the foregoing disadvantages inherent in the known types of on-line auctions now present in the prior art, the present invention provides a new method of live on-line auction using an auctioneer, whereby participants may input bids real-time, and said bids are accepted real-time by the auctioneer. While the methods created by the prior art may be suitable for the particular purpose to which they address, they are not as suitable for conducting an on-line auction using an animated auctioneer for a true method of live, interactive, competitive, rapid-fire auction. In this respect, the method of on-line auction according to the present invention substantially departs from the conventional concepts and designs of the prior art, and in so doing provides an apparatus primarily developed for the purpose of conducting an on-line auction using an animated auctioneer for a true method of live, interactive, competitive, rapid-fire auction.

SUMMARY OF THE INVENTION

The general purpose of the present invention, which will be described subsequently in greater detail, is to provide a new method of on-line auction that has the advantages of the methods of a traditional live auction mentioned heretofore, and many novel features that result in a new interactive, competitive, rapid-fire method of live on-line auction using an animated auctioneer that is not anticipated, rendered obvious, suggested, or even implied by any of the prior art, either alone or in any combination thereof.

To this end, the present invention generally is comprised of a computer network; the Internet; connectivity; a web application comprising an auction, an auctioneer, real-time bid input, real-time bid recognition, live-stream streaming processes and devices; video, visual, audio, text, biometric and electronic data; an auction bid input device; and an auction output device, all of which collectively structure, facilitate and manage the methods contemplated herein.

The computer network is comprised of a host computer and a plurality of remote computers that interact with the host computer and a plurality of servers. The computer network is the means by which the competitive, interactive, rapid-fire on-line auction shall be transmitted via the Internet, or by other means of connectivity.

In the preferred embodiment, the present invention operates a website that provides information regarding the auction and the means by which the auction participant shall be granted access to the auction, and the means by which the auction is conducted. An auction participant must first register to qualify as an auction participant through the website, and upon qualifying, the auction participant is granted access to participate in the competitive, interactive, rapid-fire, on-line, live auction.

The website of the inventive device serves as the point of entrance to participate real-time in the on-line auction, and as a source of information for the on-line auction participant. Participants may access information regarding how to register and utilize the present inventive device, and the time, manner, and rules regarding future on-line auctions.

Furthermore, the website posts an electronic catalogue of the goods and/or services available for auction. The electronic catalogue provides at least one of the following group of data regarding the auction item: visual, audio, textual, and graphical data. By way of example, the electronic catalogue may comprise a streaming video clip of a piece of property for sale that presents visual, audio and textual information about the good to the prospective auction participant. Alternatively, the electronic catalogue may comprise a series of TGP's and corresponding textual information for lower end auction items, such as clothing or accessories.

The host computer comprises a database that further comprises information data regarding the goods and/or services available for auction, as depicted in the electronic catalogue. The goods and/or services are accumulated from a variety of outside sources, and may be in a location remote from the host computer server, the source of the on-line auction. The goods and/or services available for auction may be located in remote cities and countries but nonetheless available to any auction participant at any location by way of the present inventive device.

The live, on-line auction is a real-time virtual event that is a creation of the host computer. The host computer hosts a software application that comprises the means to generate the live virtual auction, and the animated auctioneer to conduct the auction. Likewise, the software application further comprises the means for participants to interact (bid) with the application real-time.

In the preferred embodiment, the auctioneer is "animated auctioneer", said animated auctioneer is a multi-media electronic equivalent of a real-life human auctioneer. The animated auctioneer utilizes the mannerisms and protocol of the traditional auctioneer, whereby the auctioneer acts as a catalyst to promote the item for auction, by soliciting bids with the intent of obtaining the highest possible price. The animated auctioneer calls out to the auction participants, cajoling the participants to bid for a particular auction item. Likewise, in the preferred embodiment of the present invention, the animated auctioneer extols the virtues of the item available for auction, in an attempt to solicit a higher good price.

The present invention discloses several animated auctioneer "types"; each with a distinct personality and distinct characteristics. By way of analogy: an animated cartoon show with a host of characters like the "Flintstones", whereby there exist a cast of characters: Barney, Fred, Wilma, and Betty, each of whom would present a different separate, animated auctioneer "type". The present inventive device contains at least the group of celebrity, movie, music, sports, historical, and news auctioneers.

The present inventive device envisions that auction participants will come to relate, or associate with, the personality and peculiarities associated with an individual auctioneer "type"; much in the way one has a favorite animated cartoon character or celebrity with whom they watch or admire. The website of the inventive device shall contain biographical data on each animated auctioneer, such as the town in which they were born (Bedrock), likes, dislikes, of the auctioneer and so on. A seller has the option of selecting his or her auctioneer of choice, or selecting a default auctioneer.

In the preferred embodiment of the present invention, the animated auctioneer is programmed to recognize registered, qualified bidders participating in the auction. The animated auctioneer may be programmed to address said participants directly in the form of solicitation, such as, "John Doe, open up that wallet and bid!" The objectives of the auctioneer soliciting or cajoling the auction participants, are to increase the bid price, and to add excitement, exhilaration per a traditional live auction, and to add social humor to the auction by direct interaction with the participants.

As the animated auctioneer is auctioning a particular service or good, the auction participant shall view the item available for auction in conjunction with the auctioneer. The item available for auction may be presented in a variety of formats, including, but not limited to, a presentation of audio, visual, electronic, or textual data, either singularly or in conjunction with one another. By way of example, the browser of the remote computer would depict: the auctioneer vigorously auctioning a good, an audio feed of the auctioneer's voice, an image of the good currently up for auction, and textual information of the good. The browser further depicts information necessary for participants to bid competitively: the minimum start price, the current bid amount, the user identity correlated with the highest prevailing bid, and means for real-time bid input.

In the preferred embodiment, the auction participant may manipulate the presentation of the auction item, by selecting a different presentation request (such as a side view or 3-D view), or alternatively, by inputting a different presentation request from the remote computer system.

The auction participant views the interactive, competitive, rapid-fire auction from the remote computer device, and in response to solicitations from the auctioneer, bids competitively, successively and simultaneously on the item available for auction. To replicate the excitement and competitiveness of the traditional live open auction, the ability to tender bids on a real-time basis is essential to the auction. To this end, the present invention further comprises an "auction input device" (AID) that enables the auction participant to submit a rapid-fire bid, real-time to the host computer, which in turn submits the bid to auction. The auction input device may be a function of the remote computer system or a device remote from it.

The host computer system further comprises a bid mechanic verification module that functions to receive, rank, process, and validate the simultaneous and successive bids of the interactive auction participants. The host computer conveys the validated bid information to the auction. The auctioneer in turn orally conveys the updated bid information to the plurality of remote computers, and attempts to solicit a higher bid. Simultaneously, the browser of the remote computer system depicts the current bid price and its corresponding bidder identity as textual or graphical information. Upon a cessation of bidding, the auctioneer determines the winner according to the most recent, highest bid input received and notifies the plurality of remote computers on the status thereof. The results of the electronic auction are broadcast to the plurality of remote computers.

A primary object of the present invention is to provide an interactive, rapid-fire, competitive method of on-line auction that utilizes an animated auctioneer to solicit bids from the plurality of remote computers with the intent of obtaining the highest possible bid.

A primary object of the present invention is to provide an interactive, rapid-fire, competitive method of on-line auction wherein auction participants bid individually, competitively, successively, and simultaneously against one another utilizing a real-time method of bid input.

A further object of the present invention is to provide an interactive, rapid-fire, competitive method of online auction that replicates the method and protocol of a traditional open auction.

A further object of the present invention is to provide an interactive, rapid-fire, competitive method of online auction that enables the auction participant to input bids in a rapid-fire, real-time basis.

A further object of the present invention is to provide an interactive, rapid-fire, competitive method of on-line auction that unites geographically diverse parties to a central on-line auction event.

A further object of the present invention is to provide an interactive, rapid-fire, competitive method of on-line auction that provides consumers and businesses with expanded markets and profits through increased auction participation and market penetration.

There has thus been outlined, rather broadly, the more important features of the invention in order that the detailed description thereof may be better understood, and in order that the present contribution to the art may be better appreciated. There are additional features of the invention that will be described hereinafter. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 4 further illustrates the function of the auctioneer as the conductor of the auction.

FIG. 9 further illustrates the auctioneer and auction environments options available to the seller.

DETAILED DESCRIPTION OF THE PREFERRED EMBODIMENT

Figure 1:
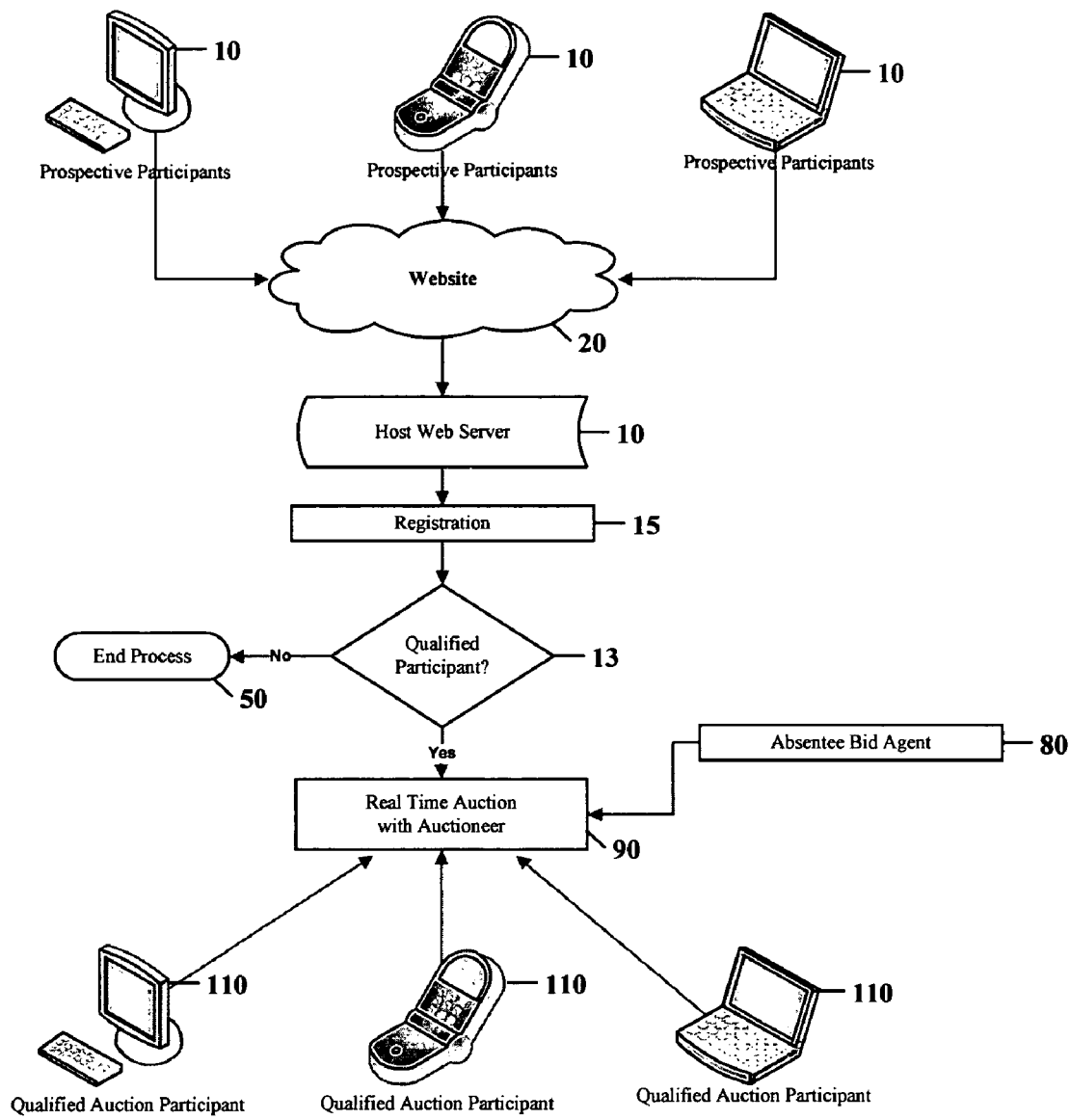
FIG. 1 illustrates an overview of the method of the present invention.

Turning now descriptively to the drawings, in which similar reference characters denote similar elements throughout the several views, the attached figures illustrate a interactive, rapid-fire, competitive method of on-line auction; said auction comprising a computer network, the Internet, an auction, an animated auctioneer, real-time, live-stream streaming processes and devices, video, visual, audio, text, biometric and electronic data, an auction input device, and an auction output device.

FIG. 1 denotes the overall computer network. The computer network is the foundation by which the auction 90 is broadcast real-time via the Internet 20 to the plurality of remote computers 10 and through which qualified participants 13 bid in the auction 90. The computer network is comprised of a host web server 30, an auction information server 40, an auction server 60, an absentee bidder agent 80, and a plurality of remote computers 10 that are connected to the host web server 30 through communication lines. The web host server 30 initiates, structures, and manages the relationships between the computer network and the remote plurality of computers 10. The computer network protocol servers cooperate with separate database computers, and the database computers are accessible to at least one of the hyper-text transport protocol servers to allow for the retrieval of information.

The web host server 30 commences the real-time stream of electronic data transfer between the parties to the auction 90. Connectivity between the plurality of remote computers 10 and the web host server 30 is comprised of telecommunications, satellite communications, broadband communications and other means of communication utilized to access the Internet 20.

The auction broadcast is further comprised of devices and processes that serve to simultaneously transmit electronic data between the parties to the auction 90. Electronic data comprises at least one of the group of audio, video, visual, text, or biometric data exchange between the host web server 30 and the plurality of remote computers 10.

The data exchange is reciprocal; that is, the host web server 30 has the ability to transmit varied electronic data to the plurality of remote computers 10 and the plurality of remote computers 10 has the ability to transmit electronic data to the host web server 30. The plurality of remote computers 10 shall not transmit electronic data amongst themselves 10; however, the host web server 30 can transmit electronic data from any one of the plurality of remote computers 10 to all of the plurality of remote computers 10 via a broadcast on the browser of the remote computer system 10.

The plurality of remote computers' 10 configuration is comprised of connectivity with the host web server 30, and wherein the browser of the remote computer system runs an application to interface with the host web server 30 via the Internet 20, and an auction output device, and an auction input device. The auction output device is a device that visibly and audibly displays the auction 90 broadcast to the qualified auction participant 110. The present invention utilizes a variety of output devices, including at least one of the group of a monitor connected to the remote computer 10, a telephone, a cellular phone, a personal digital assistant (PDA), an ipod, or other such remote devices used to retrieve and send information over the Internet 20.

The auction 90 itself is a virtual auction that is broadcast real-time via the host web server 30 and is a function of the host computer 30. The auction 90 comprises a plurality of goods, services, items, real property, securities or commodities available for auction. The auction 90 comprises a fixed start time but no definite end time. The auction 90 utilizes an auctioneer 100 to conduct the auction 90. The items available for auction are remote from the auction 90 by necessity; said auction 90 being a virtual event that is a function of the host computer server 30 (vis-à-vis a traditional auction located in a physical location); said virtual auction 90 being the on-line vehicle to sell physical goods and/or tangible services.

In one instance, the goods reside at various warehouses or in various locations and locales, and the auction 90 serves as a vehicle to sell these lots of goods to a global audience that would otherwise be precluded as a potential market. In another instance, the auction 90 serves as a vehicle whereby the qualified participants 110 may submit individual goods or services for auction. The "participant item" auction serves as a vehicle for qualified participants 110 to auction their goods or services using the website 20. The auction 90 serves to facilitate the auctioning of goods, much in the way that Ebay does, with the fundamental distinctions that the present inventive device provides the services of an animated auctioneer 100, a real-time live auction 90 broadcast, and real-time bid input 62 and real-time bid recognition 70.

Figure 2:
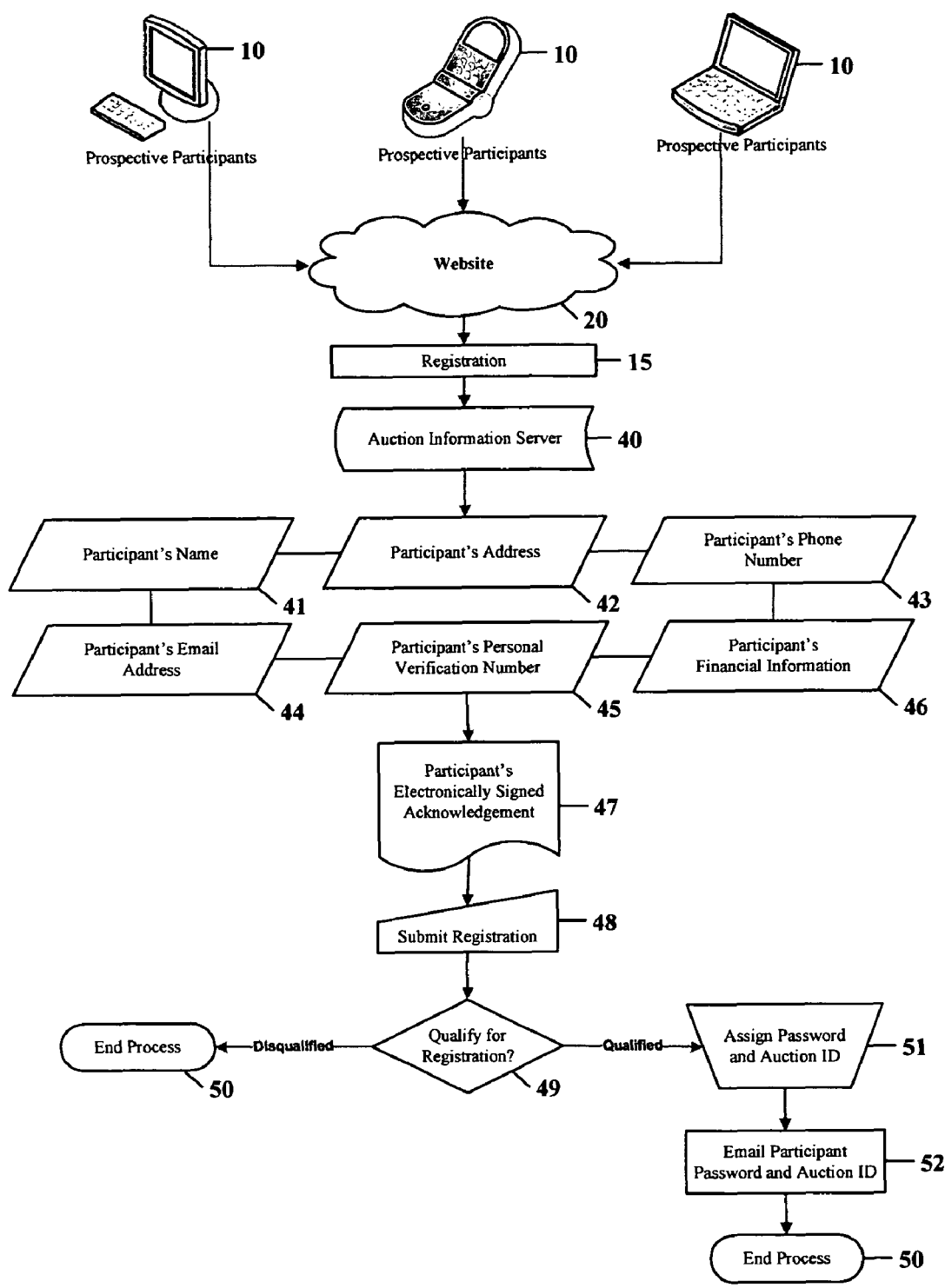
FIG. 2 is a flowchart that illustrates the process of registering to become a qualified participant in the on-line, live auction.

FIG. 2 illustrates the process of participant registration 15 to become a qualified participant 110. Registration 15 may be done prior to the auction 90 or during the auction 90. The prospective participant 10 accesses a registration form on the website 20 and inputs the following information to be processed by the auction server 40: (a) the registrant's name 41, and (b) the registrant's address 42, and (c) the registrant's phone number 43, and (d) the registrant's electronic mail address 44, and (e) the registrant's personal verification information; including at least one of the group of a government issued document, biometric data, or personal identifying information 45 and (f) the registrant's qualifying financial information 46, and (g) an electronically signed acknowledgement whereby the registrant agrees to abide by the rules and regulations of the auction 47.

The registrant submits the registration form 48 to the host web server 30 via electronic mail from the remote computer 10. If the registration criteria are met 49, the host computer 30 assigns a password and user ID 51 to the registrant that corresponds to the registrant's registration account 15. Said password and user ID 51 are the means by which the qualified participant 110 enters an auction 90 after registration 15. The host web server 30 notifies the registrant of the password and user ID 51 via electronic mail 52 and the auction information server 40 processes the registration 15 simultaneously. A registrant that does not qualify 49 is notified accordingly and denied access to the auction 50.

Figure 3:
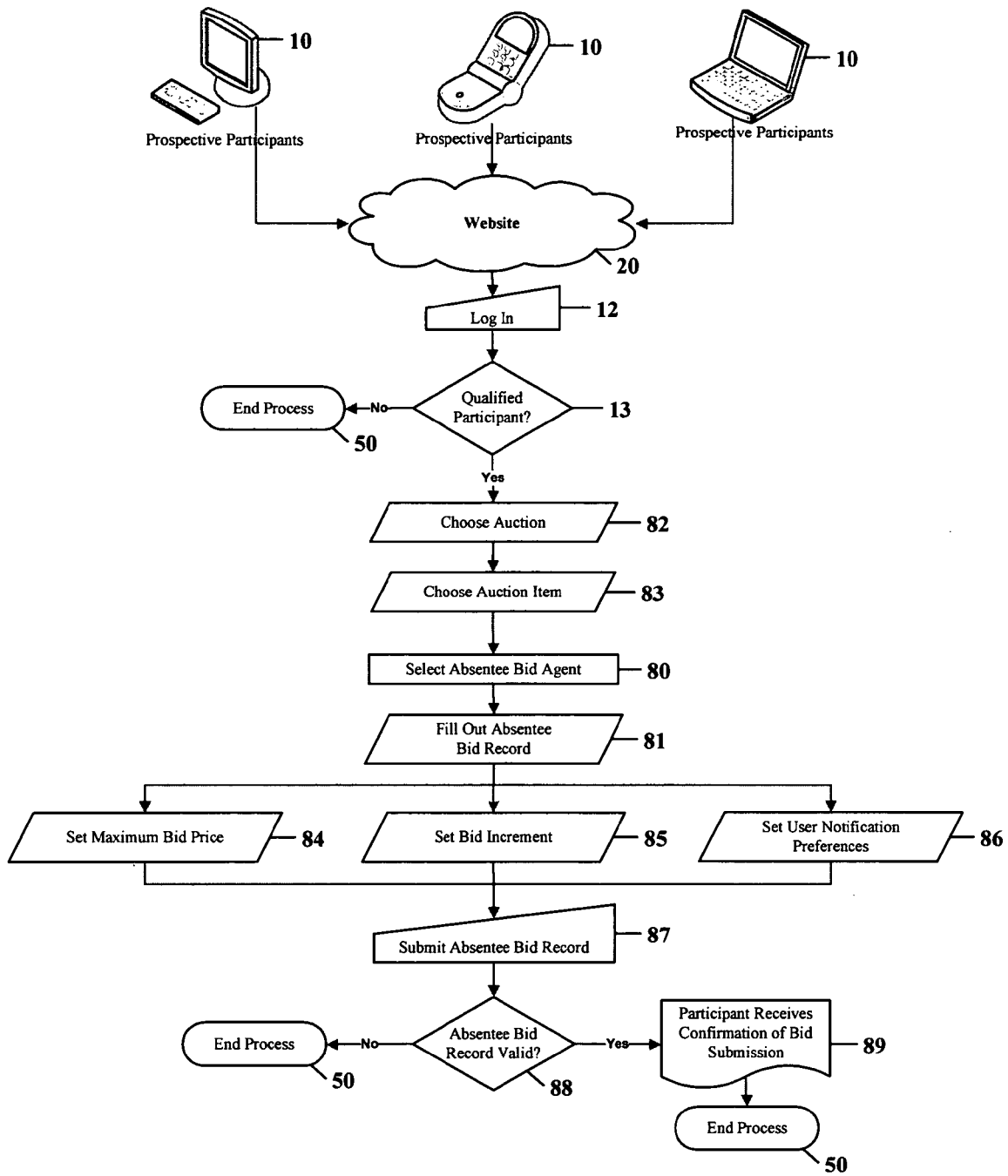
FIG. 3 is a flowchart that illustrates the process of using the Absentee Bid Agent to act as a proxy bid on the qualified participant's behalf.

FIG. 3 denotes the mechanics utilized by the Absentee Bid Agent (ABA) 80 to process a qualified participant's 110 request to use the ABA 80. The absentee bid agent 80 is a proxy bidder that acts as an agent for a qualified participant 110, when said qualified participant 110 is unable or unwilling to participate in the auction 90 at the auction's 90 designated start time and date, or during the course of the auction 90. As such, utilizing the ABA is a prerequisite prior to the auction 90 start, or may be utilized at anytime during an auction 90, prior to the close of the auction 90.

The absentee bid agent 80 submits bids 62 independently to the auction 90 on a real-time basis on behalf of the qualified participant 110. The qualified participant 110 using the ABA 80 is subject to the same rules of auction and qualifying criteria as the interactive auction participant 110. Likewise, the ABA 80 bid is subject to the rules established by the bid mechanic verification module 70 (as is the qualified auction participant 110) per the rules defined in FIG. 5.

FIG. 3 depicts the process of creating and submitting 87 an absentee bid record 81 for a particular auction item to be auctioned in a particular auction 90. A qualified participant 110 accesses the website 20, and logs in 12 using his or her user ID and password 51. Upon the host computer 30 qualifying 13 the participant 110, the participant chooses the auction 90 of choice 82 and selects the particular auction item 83 offered for sale. After selection of the auction item 83, the qualified participant 110 selects the ABA option 80 as a bid agent, and completes the ABA record 81.

The ABA bid record 81 comprises the following information: (a) the particular auction 90 the auction participant 110 wishes the ABA to bid on 82, and (b) the item of auction the qualified participant 110 wishes to bid on 83, and (c) the maximum bid amount the ABA 80 is authorized to bid 93 for the auction item 83, and (d) the bid increments 85 the ABA is to use to reach the maximum bid price 84, and (e) the user notification preferences 86 selected by the qualified participant 110.

With respect to the bid record 81 components, the bid increments 85 by which to reach the maximum bid amount 84 may be determined by the rules of the auction (predetermined bid increments determined by the rules of auction) or by the auction participant 110 who arbitrarily chooses the amounts by which the bid increment 85 is to be determined; such as a fixed dollar amount or percentage. The qualified participant 110 further chooses notification preferences 86. Notification preferences 86 are at least one of a group of: no notification of the auction results, or the qualified participant 110 is notified when their maximum bid price 84 has been exceeded by another bidder during the course of the auction 90 (giving said qualified participant 110 the opportunity to increase the maximum bid price 84 during the auction 90), or when the qualified participant 110 prevails as the winning bidder and the corresponding bid amount of the qualified participant's 110 winning bid, or when the auction 90 has closed and the results thereof. On completion of the bid record 81 the auction participant 110 submits 87 the bid record 81 to the host web server 30. Upon validating 88 the bid record 81, the host web server 30 sends a confirmation 89 to the remote computer 10.

Figure 4:
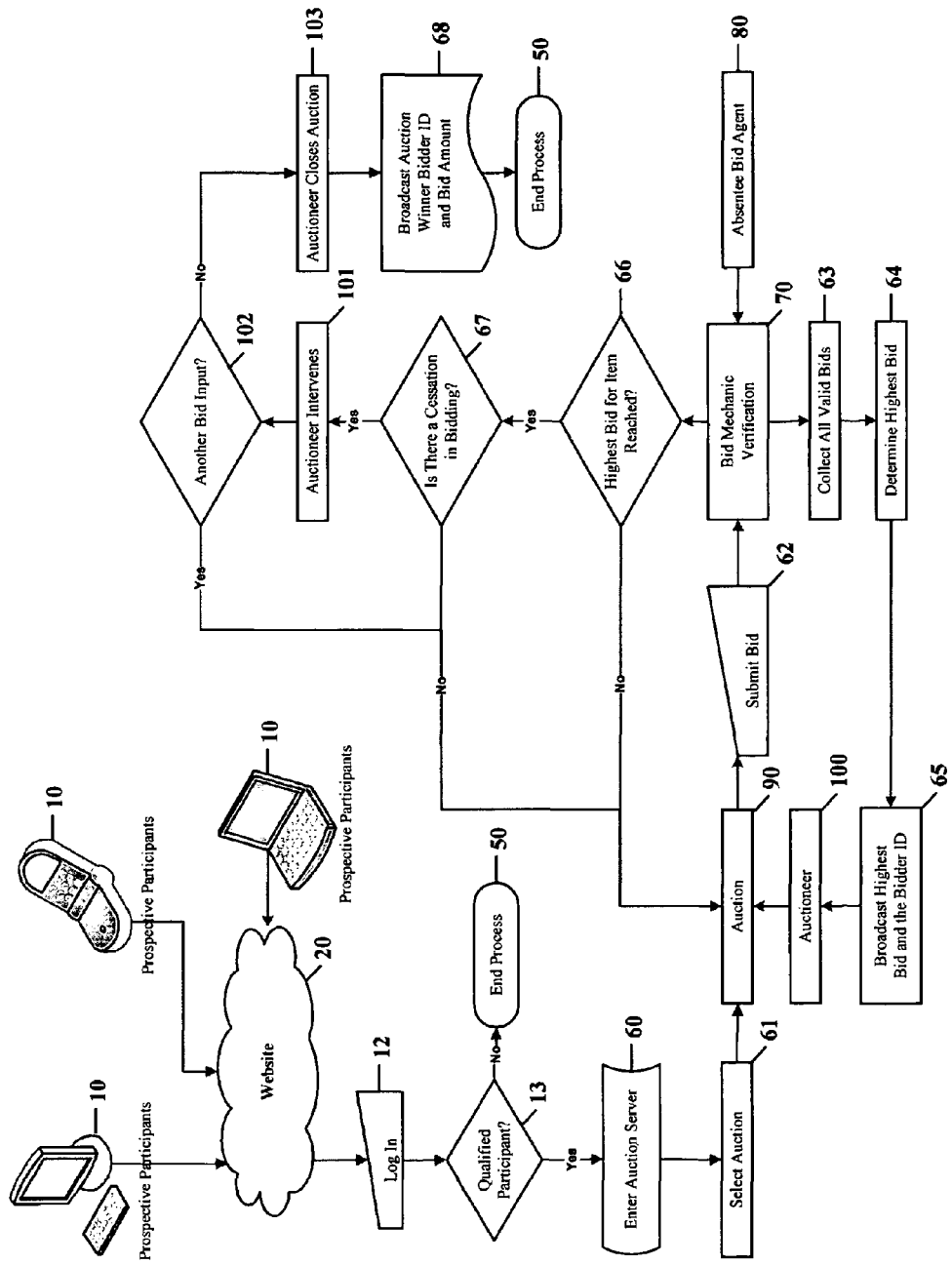
FIG. 4 is a flowchart that illustrates the process of the plurality of remote computers submitting bids to the live interactive method of auction and determining the auction winner.

FIG. 4 is a flowchart that illustrates the preferred embodiment in its entirety: qualified auction participants 110 bidding 62 real-time in response to the solicitations ad actions of the animated auctioneer 100 in a live, on-line auction 90.

Using a remote computer prospective participants 10 access the inventive device by way of a website 20 maintained by the host computer 30 on the Internet 20. Prospective participants 10 log in 12 using their respective User ID's and passwords 51 thereby qualifying 13 as qualified auction participants 110. Upon qualifying 13, the qualified participant 110 is granted access by the auction server 60 to the auction 90.

Several auction 90 choices may be available or occurring at the same time; the auction participant 110 selects 61 a particular auction 90. Upon selection 61 of an auction 90, the host web server 30 establishes a real-time connection between the host web server 30 and the remote computer 10 to allow the remote computer 10/qualified participant 110 access to the auction 90 real-time. After entering 60 the auction 90, the auction participant 110 engages in a real-time exchange with the auction 90, the auctioneer 100, and with other registered auction participants 110.

Upon qualifying 13, the qualified participant 110 may enter and participate in the auction 90 at any time during the auction 90, prior to the auction 90 close. As with the traditional form of open action, the bidding for a particular auction item is opened at a predetermined minimum and bid solicitation 101 is conducted audibly by the animated auctioneer 100. In response to the auctioneer's 100 solicitations 101, an auction participant 110 bids 62 individually, competitively, successively and simultaneously in conjunction with the other auction participants 110.

Specifically, a qualified participant 110 enters the auction 90, submits 62 a bid to the auction 90. The bid input 62 by the qualified participant 110, and the bid input 62 by the absentee bid agent 80, is submitted to the bid verification module 70. The bid verification module 70 collects 63 all valid bids (see FIG. 5), determines the highest bid 64, broadcast the highest bid and the corresponding bidder ID 65, to the auctioneer 100 and the auction 90. The bid mechanic verification module 70 continuously updates the bid information 66 as qualified 70 bids from the auction participants 110 supersede one another in bid amount 66. The auction server 60 determines when real-time bid input 62 originating from any one or all of the plurality of remote computers 10 has ceased 67. Upon a cessation of bidding 67, the auctioneer 100 intervenes 101 with the intent of soliciting a higher bid 102 amount.

Should the auctioneer's 100 intervention 101 garner another bid input 62, said bid is tendered to the auction 90, and the bid input 62, bid mechanic verification 70 and submission to the auction 90 and the auctioneer 100 is repeated, per the process described above. The auctioneer's 100 step of intervening 101 upon bid cessation 67 entails a final attempt by the auctioneer 100 to solicit a higher bid input 62 from the plurality of remote computers 10. The animated auctioneer 100 attempts to solicit 101 a higher bid input 102 per the traditional method of auction, with the auctioneer 100 calling "I have 100, do I hear 200, do I hear 200?" In the preferred embodiment, the auctioneer 100 audibly calls out for higher bid input 102; said qualified participants 110 hearing the auctioneer's 100 solicitations 101 on the remote computer 10. Additionally, the auctioneer 100 is physically gesturing and promoting the item for sale in an attempt to garner additional bid input 102. Should the auctioneer 100 be successful in soliciting 101 further bid input 102, the auction 90 continues as illustrated and explained above.

If auctioneer intervention/solicitation 101 from the auctioneer 100 fails to generate further bid input 102, the auctioneer 100 moves to close 103 the auction 90 when bid input 62 ceases 102. The animated auctioneer 100 closes the on-line live auction 90 per the method of a traditional auction by calling out upon the cessation 67 of bidding, and no further bid input 102 from qualified participants 100, "Going once . . . , going twice . . . , sold!" or some variation thereof. As with the bid solicitations and shilling of the auction good for sale, the close of the auction 90 is an audible and visual broadcast on the browser of the remote computer 10. At which time the auctioneer 100 closes 103 the auction 90, the auctioneer 100 notifies the qualified participants 110 of the auction 90 outcome, including the winning bid amount 64 and the corresponding identification number 51. Said auction information is further broadcast to the browser of the remote computer as a visual and audible result (See FIG. 7).

With further reference to FIG. 4, FIG. 4 depicts the essential functions of the animated auctioneer 100. In the preferred embodiment, the on-line auction 90 parallels the process and protocol of the traditional open auction. Likewise, the animated auctioneer 100 replicates the role of the traditional auctioneer, whereby the auctioneer is the central figure that serves to conduct the auction, interact socially with the auction participants one-on-one, actively promote the good for auction, solicit higher bid amounts, and move to close the auction upon a cessation in bidding.

The auctioneer 100 may be programmed to recognize registered bidders 110 participating in the auction 90. The auctioneer 100 may address said auction participants 110 directly in the form of solicitation or communication, such as, "John Doe, open up that wallet and bid!", or some other form of solicitation or communication. The ability of the animated auctioneer 100 to recognize a particular auction participant 110 is a function of the host computer 30, whereby the host computer 10 culls personal information from the auction participant's 110 registration account 15 (such as a username or first name) and conveys said registration account 15 information to the auctioneer 100. The auctioneer 100, utilizes the participant information to increase the level of participant involvement and entertainment of the auction 90.

In the preferred embodiment, the live, on-line auction 90 utilizes a virtual animated auctioneer (generally referred to as the "auctioneer") 100 to conduct the auction 90. The auctioneer 100 consists of a software application that is a function of the host computer 30. The animated auctioneer 100 is the virtual, on-line equivalent of a real-life human auctioneer; said animated auctioneer 100 replete with the mannerisms and protocol thereof. To wit, the animated auctioneer 100 is an electronic personification of the traditional human auctioneer, embodying the same mannerisms rules of auction, and protocol. Most importantly, are the functions by which the animated auctioneer 100 endows the on-line auction 90. The primary functions the animated auctioneer 100 provides are: the animated auctioneer 100 offers the item for sale, and the animated auctioneer 100 solicits 101 bids, the animated auctioneer 100 interacts with the qualified participants 110, the animated auctioneer 100 accepts bids 102, and the animated auctioneer 100 moves to close 103 the auction 90 upon a cessation of bidding 67.

Figure 5:
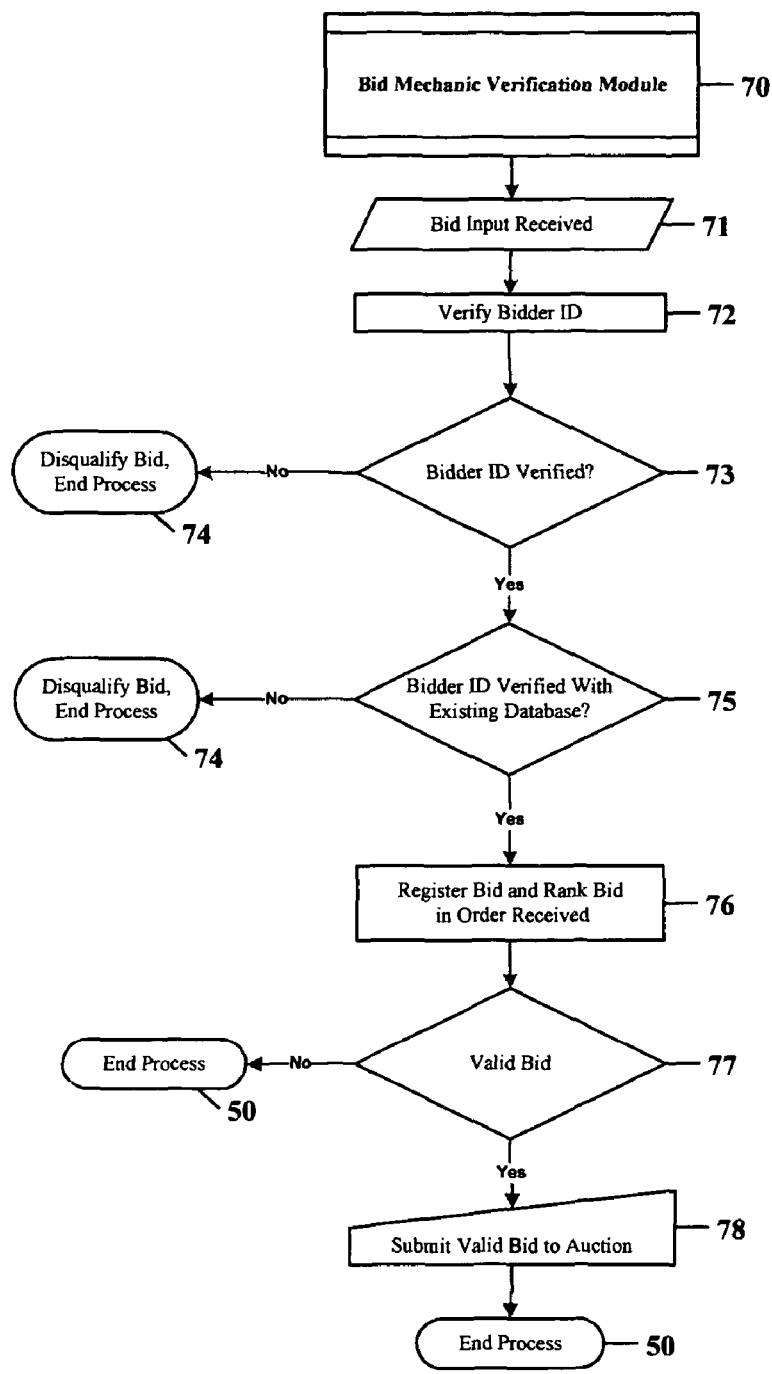
FIG. 5 is a flowchart that illustrates the process of submitting and validating real-time bids submitted to the live auction from the plurality of remote computers and from the absentee bid agent.

FIG. 5 is a flowchart that illustrates the bid mechanic verification module 70. The bid mechanic verification module 70 validates bids input 62 real-time to the auction 90 and submits validated bids 77 to the auction 90. Upon a bid input 62 to the auction 90, the bid mechanic verification module 70 receives 71 bids input 62 from auction participants 110. The bid mechanic verification module 70 verifies 72 the bidder ID 51 submitting 62 the bid to auction 90. Upon said bidder ID 51 being verified 73 with the existing host computer 30 database 75, the bid mechanic verification module 70 registers and ranks 76 the bid in the order received 76. A valid bid 77 is submitted to the auction 78 by the bid mechanic verification module 70 in the order ranked and received 76.

Figure 6:
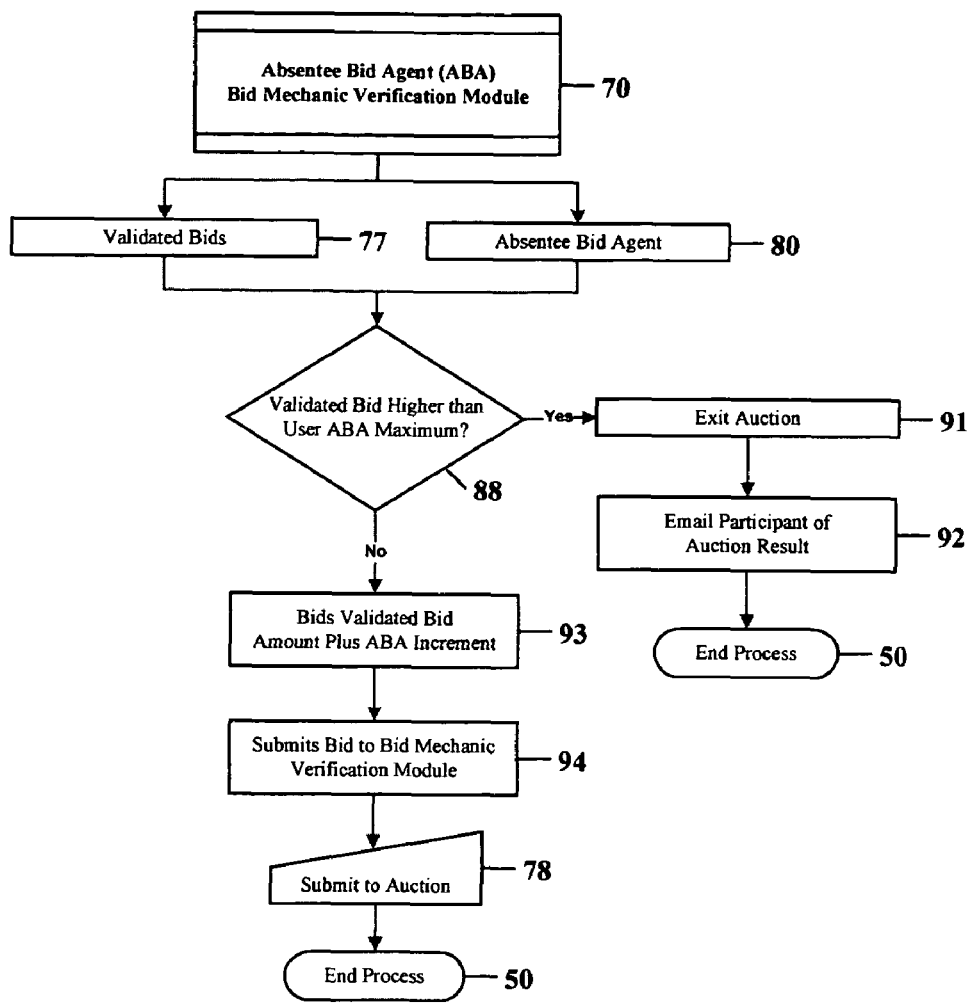
FIG. 6 is a flowchart that illustrates the process of the absentee bid agent submitting bids to the live auction on behalf of a qualified participant.

FIG. 6 illustrates the Absentee Bid Agent ABA) 80 submitting bids to the auction 90 using the bid mechanic verification module 70. The Absentee Bid Agent 80 works in conjunction with the bid mechanic verification module 70 by submitting bids 62 in accordance with the rules established by the bid mechanic verification module 70 (see FIG. 5). The Absentee Bid Agent 80 (bidding on behalf of qualified participants unable or unwilling to compete real-time in the auction 90) competes with validated bids 77 submitted by the qualified participants 110 submitting 62 bids real-time to the auction 90. The Absentee Bid Agent 80 evaluates the current validated bid 77 amount vis-a-vis the maximum bid amount 84 defined in the ABA record 81 (said ABA record is determined by the qualified participant 110, see FIG. 3). Should the current validated bid 77 amount exceed the maximum bid input 84 in the ABA record 81, the Absentee Bid Agent 80 exits the auction 91, and notifies the qualified participant 110 of the results thereof, per the notification preferences 86 in the ABA record 81. Should the ABA maximum bid input 84 amount exceed 88 the current validated bid 77 amount, the Absentee Bid Agent 80 automatically bids 93 the current validated bid 77 amount plus the bid increment 85 amount (as defined in the ABA record), on the interactive auction participant's 110 behalf. The Absentee Bid Agent 80 bids up to the maximum bid amount 84 established by the ABA record 81. The Absentee Bid Agent 80 submits the bid 94 to the Bid Mechanic Verification Module 70 real-time during the course of the auction 90, and the bid mechanic verification module 70 in turn submits 78 the validated bid 77 to the auction 90. The Absentee Bid Agent 80 bids 94 competitively and successively until the prescribed maximum bid amount 84 is reached, or until the bid record 81 prevails as the winner, whichever occurs first. The Absentee Bid Agent 80 automatically outbids other qualified participants/bidders 110 until said maximum bid amount 84 is reached or the bid record prevails as the highest winning bid 64. Upon the cessation of bidding 67 the Absentee Bid Agent 80 automatically exits 91 the auction 90 and notifies the auction participant 110 of the results thereof 92.

Specifically, the Absentee Bid Agent 80 operates as follows: (a) the Absentee Bid Agent 80 operates separate and independent as an agent for a qualified participant 110, but is nonetheless subject to the same rules of auction 90 and the bid mechanic verification module 70, and (b) the Absentee Bid Agent 80 determines the prevailing bid amount 84 per the bid record 81, and (c) determines whether the user ABA maximum as determined by the bid record 81, exceeds the validated bid amount 77, and (d) the Absentee Bid Agent 80 bids the current prevailing bid 77 plus the bid increment amount 85 per the bid record 81, and (e) submits the absentee bid 81 to the bid verification module 70 for submission to the auction 90.

Figure 7:
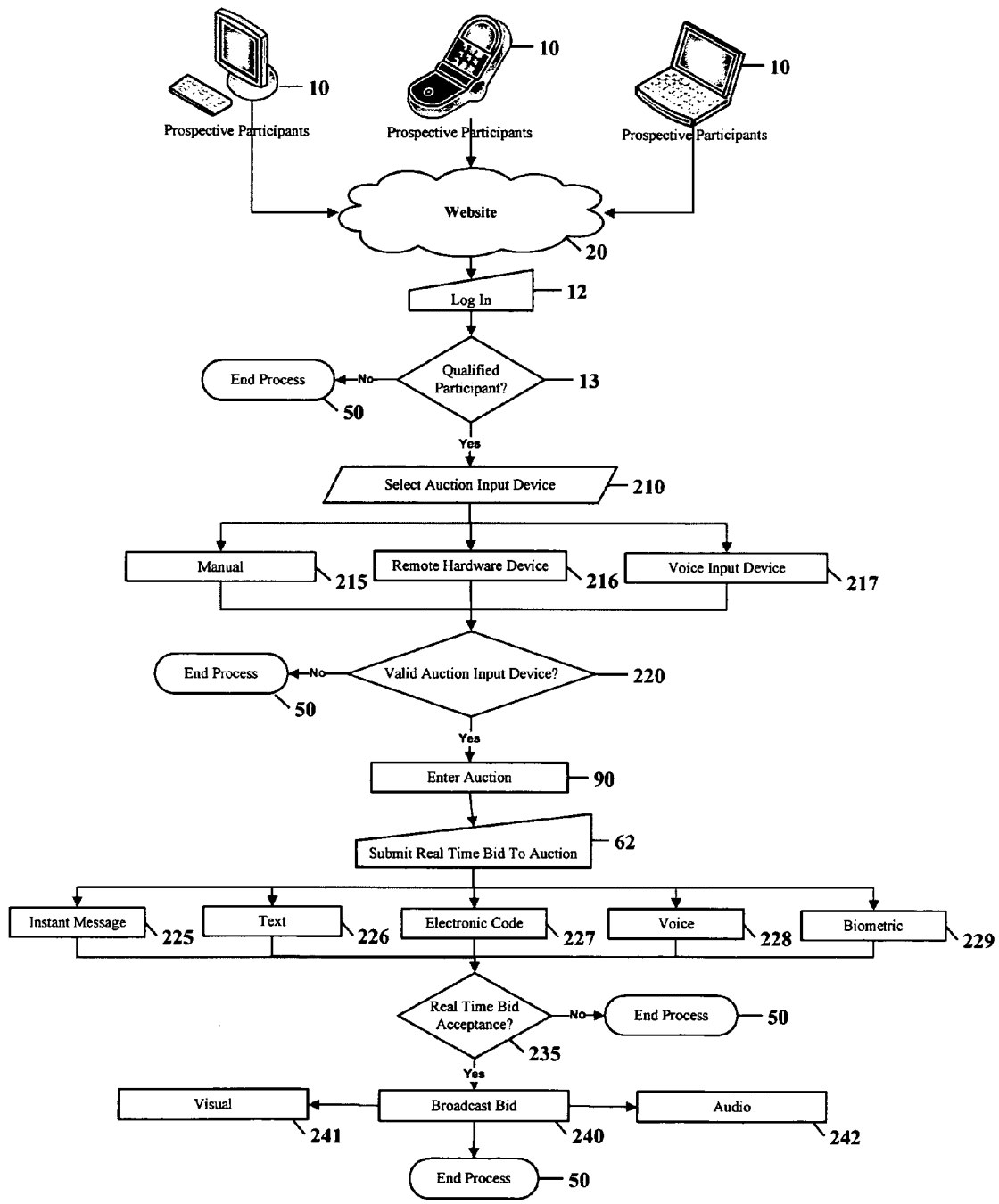
FIG. 7 illustrates the process of a qualified participant selecting an auction input device (AID) and submitting a real-time bid to the live auction using the auction input device selected.

FIG. 7 is a flowchart that illustrates the operation of the Auction Input Device (AID) 210. The Auction Input Device 210 is essential to the functionality of the present invention. The AID 210 operates by enabling qualified participants 110 input 62 bids real-time to the auction 90, thereby ensuring that the rapid-fire, competitive bid input of the traditional open auction prevails in the on-line, live auction 90. FIG. 7 illustrates a qualified participant 110 selecting the AID 210 of choice prior to participating in the auction 90. The AID 210 may be a component of the remote computer 10 whereby bids are manually input 215 using the remote computer 10, or the AID 210 may be a hardware device 216 external from the remote computer 10, or a voice input device 217. Said voice input device 217 may be a function of the remote computer 10 or a hardware device external to the remote computer 10. Each AID 210 has the ability to submit 62 a bid real-time to the auction 90 during the auction 90. The host computer 30 validates 220 the AID 210 prior to allowing the qualified participant 110 entering the auction 90 to bid 62 using the AID 210. A qualified participant 110 may select to use more than one AID 210 to bid 62 real-time in the auction 90. For example, an auction participant 110 may opt to use a manual input device 215 in conjunction with a remote hardware voice input device 217, thereby using two types of bid input. However, only one AID 210 submits 62 a bid real-time for each singular bid input 62; said AID 210 being used interchangeably with the other. For example, the qualified participant 110 may opt to input a manual bid 215 using a keyboard of the remote computer, and subsequently call out/submit 62 a bid using the voice input device 21 in rapid sequence as bids are input 62 real-time to the auction 90.

With further respect to FIG. 7, the manual input 215 of a bid via the remote computer 10 includes the bid input comprising at least one of a group of alpha or numeric code 227, or text 226, or numbers 226, or voice input 228, or biometric 229 input (the auction participant 110 inputs a biometric 29 bid by using at least one of the group of a signature, or a voiceprint, or a handprint, or fingerprint, or a retina information), or other data exchange 225 such as instant messaging; said manual input 215 using at least one of the group of a mouse, or an electronic capture pad, or a keyboard, or a microphone, or a software program running on the remote computer 10 to input 62 the bid real-time.

With further respect to FIG. 7, the remote hardware device 216 includes the bid input comprising at least one of a group of alpha or numeric code 227, or text 226, or numbers 226, or voice input 228, or biometric 229 input (the auction participant 110 inputs a biometric 29 bid by using at least one of the group of a signature, or a voiceprint, or a handprint, or fingerprint, or a retina information), or other data exchange 225, such as instant messaging; said remote hardware device 216 using at least one of the group of an electronic capture pad, or a keypad, or a microphone, or a software program running on the remote hardware device 216, or a PDA, or cell phone, or a BlackBerry, or an ipod to input 62 the bid real-time.

With further respect to FIG. 7, the voice input device 217 includes the bid input comprising at least one of a group of alpha or numeric code 227, or text 226, or numbers 226, or voice input 228, or biometric 229 input (the auction participant 110 inputs a biometric 29 bid by using at least one of the group of a signature, or a voiceprint, or a handprint, or fingerprint, or a retina information), or other data exchange 225, such as instant messaging; said voice input device 217 using at least one of the group of a microphone, or a software program running on the voice input device 216, such as instant messaging 225, or a PDA, or cell phone, or a BlackBerry, or an ipod to input 62 the bid real-time. The voice input device 217 may further comprise at least one of the group of interactive voice recognition software (IVR), speech to text software (STT), or speech recognition software.

Irrespective of the type of bid input, the host computer 30 accepts 235 the bid real-time (see FIG. 4) and broadcasts 240 the validated bid to the browser of the remote computer 10. The broadcast 240 may be either a visual display 241 of the validated bid 77, or an audio broadcast 242 of the validated bid 77 that is audibly heard as the validated bid 77 is visually displayed on the browser of the remote computer 10.

Figure 8:
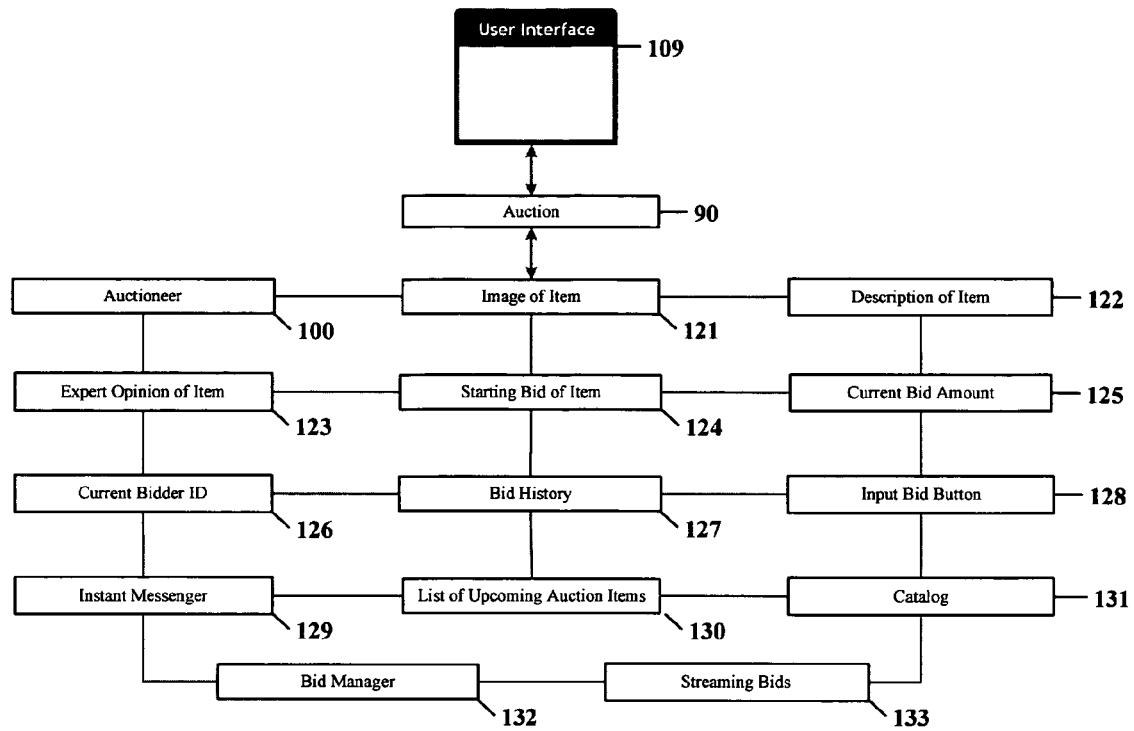
FIG. 8 illustrates the information available on the browser of the remote computer system when the live auction is in progress.

FIG. 8 is an illustration that depicts the information available on the user interface 109 of the remote computer 10 as the auction 90 is in progress. The real-time broadcast simultaneously displays the following information to the browser of the remote computer 10: the auction 90, said auction 90 which further comprises at least one of the group of: an animated auctioneer 100 who actively solicits bids from the interactive auction participants 110 per the traditional method of open auction wherein the auctioneer 100 promotes the good offered and attempts to increase the price 102, and an electronic image 121 of the particular goods, service, security, commodity, or item available for auction 90 (said image 121 comprising at least one of a group of audio, or visual, or video or text data), and a description 122 of a particular goods, service, security, commodity, or item available for auction 90 (said description 122 may comprise audio, visual, video or text data), and an expert opinion 123 regarding a particular goods, service, security, commodity, or item available for auction 90 (said expert opinion 123 may comprise audio, visual, video or text data 123), and the minimum starting bid 124 of a particular goods, service, security, commodity, or item available for auction 90, and the current bid amount 125, and the high current bidder 126 as represented by the Bidder ID 51, and the bid history 127, and an input bid button 128, and an instant messenger option 129, and a schedule 130 of the upcoming items to be auctioned, and a catalogue 131 of items available for auction 90, and a bid manager 132 option, and a broadcast of streaming bids 133 that are displayed real-time as they are input 62 to the auction 90.

With respect to the catalogue 131, images 121 and descriptions 122 of the items available for auction 90 are stored in an electronic format and compiled in an electronic catalogue 131 (the equivalent of the hard-copy auction catalogue) which is viewed via the website 20 or may be downloaded as a file to the remote computer 10. Prospective auction participants 110 can peruse the electronic catalogue 131 prior to the auction 90 start.

Figure 9:
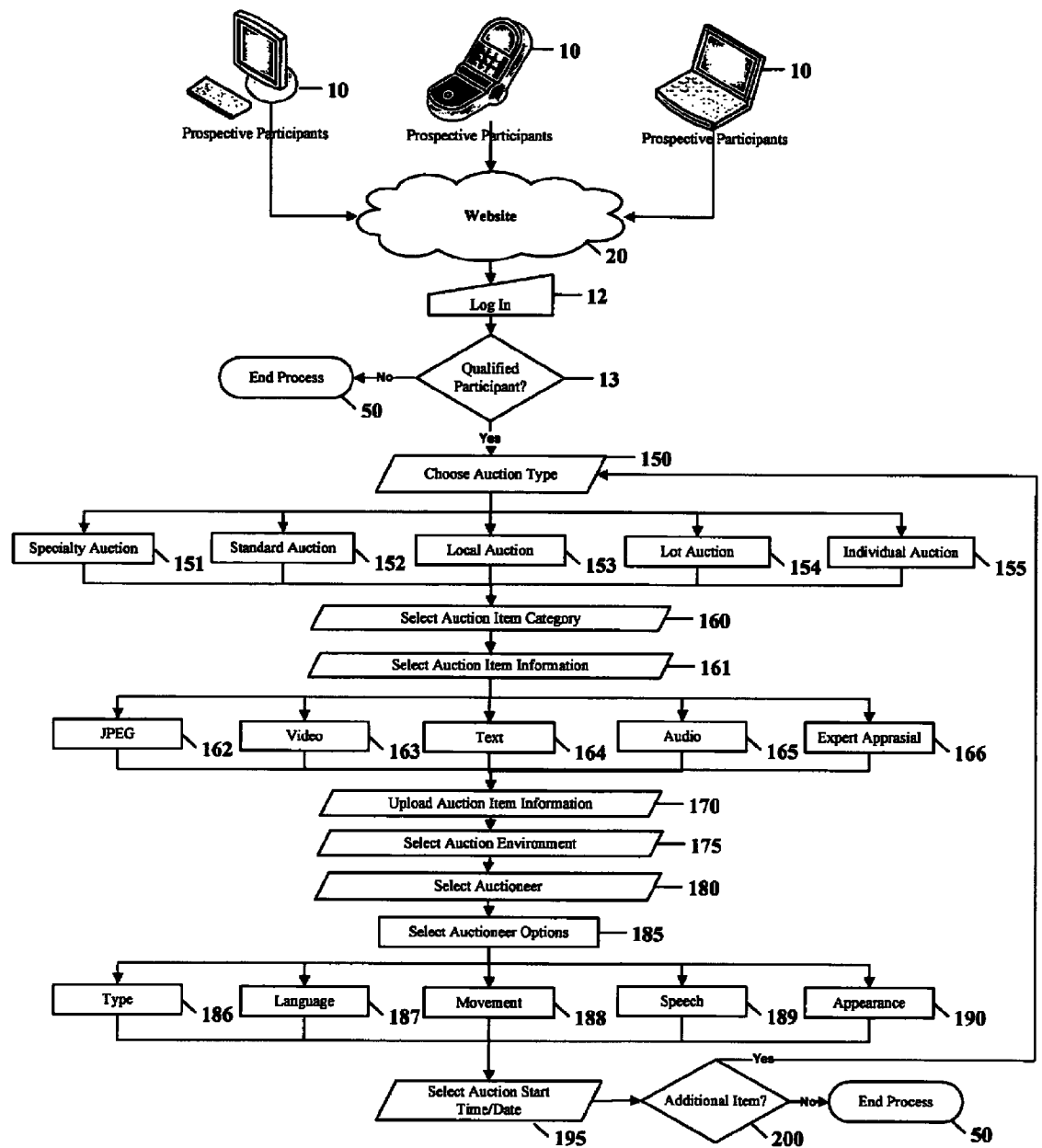
FIG. 9 is a flowchart that illustrates the process for a seller/qualified participant to post an item(s) for sale to be auctioned at a time and date determined by the seller.

With respect to FIG. 9, in another embodiment of the present invention, the items available for auction 90 are comprised by submissions of items for auction 90 from the remote plurality of computers 10. In this method of auction, qualified participants 110 access the website 20 of the present invention to post an item for auction 90. FIG. 9 is a flowchart that illustrates the process of a seller using the inventive device to post an item for sale in the auction 90.

The method of a qualified participant/seller 110 posting an auction item for sale comprises the following steps: the prospective participant 10 accesses the website 20 by way of the remote computer 10, the prospective participant 110 log ins using the Bidder ID and corresponding password 51 (see FIG. 2), the host computer 30 verifies 13 the Bidder ID and corresponding password 51, the qualified participant selects the type of auction 90 in which to post the item for sale; auction 90 types include at least one of the group of a specialty auction 151, or a standard auction 152, or a local auction 153, or a lot auction 154, or an individual auction 155. With respect to the auction types, said auction types are defined as follows:

A specialty auction 151 is an auction 90 that is intended to showcase a particular type of item for sale, for example an auction dedicated solely to automobiles or to real estate or to expensive antiques. The specialty auction 151 allows the qualified participant/seller 110 to showcase the item for sale in an auction 151 specifically designed to auction 90 that particular type of good, thereby maximizing the value of the item. Moreover, the specialty auction 151 provides the qualified participant/seller 110 with a focused auction audience; one that is specifically in quest of the specialty item. The specialty auction 151 also benefits the buyer 110 by providing an auction 90 that makes available only a featured type of good that the buyer is in quest of.

A standard auction 152 is an auction 90 that comprises any variety of items for sale. The standard auction 152 starts frequently and repeatedly (i.e. in increments of every 15 or 30 minutes whereby many standard auctions 152 are occurring simultaneously), thereby giving the qualified participant/seller 110 many options of an auction 90 start time and date.

The local auction 153 provides a local auction marketplace for the buyer and seller 110 alike. The local auction 153 is particularly suited to auction items that are either too cumbersome or costly to ship, such as furniture or automobiles, or for auction items whereby the buyer desires an in-person inspection.

The lot auction 154 is designed to auction multiple identical items (as in a "lot" of items), or the lot auction 154 may be utilized when a large amount of like merchandise needs to be liquidated by the seller. The lot auction 154 provides the qualified participant/seller 110 a convenient avenue to sell numerous or vast quantities of merchandise without having to post each individual item for sale, rather just the quantities thereof.

The individual auction 155 is an auction that is personal to the qualified participant/seller 110. The individual auction 155 allows the qualified participant/seller 110 to select a unique auction environment and a unique auctioneer, both of which are proprietary to the qualified participant/seller 110. The individual auction 155 is intended to allow the qualified participant/seller 110 to brand the auction 90 and to brand the auctioneer 100 with an image and/or theme that is resplendent of the goods and the image of the qualified participant/seller 110. By way of example, a corporate entity such as Radio Shack may elect to auction its wares via the method of the present invention. Radio Shack may customize the auction environment 175 by choosing an auction backdrop that resembles a typical Radio Shack storefront. Likewise, the Radio Shack auctioneer 100 may be personalized to resemble a typical employee with the company uniform and other such company details as appropriate. Said customization of the auctioneer 100 and the environment 175 to reflect the company brand/image are unique and proprietary to the qualified participant/seller 110. That is, no other qualified participant/seller 110 may post an item on the branded company site, nor may any other qualified participant/seller 110 copy or replicate the branded company site. The individual auction 155 is available to any qualified participant/seller 110 whether they are a corporate entity or not, say for example, a power seller per the high volume sellers common to eBay and other on-line auctions.

Subsequent to the qualified participant/seller 110 selecting the auction type 150, the qualified participant/seller 110 selects the appropriate auction item category 160. There exist innumerable auction item categories 160, for example a category for jewelry, or for computers, or for home furnishings, or for sports memorabilia, etc. Upon determining the appropriate auction item category 160, the qualified participant/seller 110 selects the auction item information 161 the qualified participant/seller 110 wishes to use to describe the item for auction 90. The qualified participant/seller 110 has several options regarding how to promote the item for sale. The qualified participant/seller 110 selects to use at least one of the group of a JPEG 186, or a video clip 163, or a text description 164, or an audio clip 165, or an expert appraisal 166 to describe and promote the item for auction 90. The qualified participant/seller 110 may elect to use a singular auction information 161 option, multiple auction item information 161 options, or any combination thereof. For example, a qualified participant/seller 110 desirous of selling a valuable baseball may select to use a JPEG 162 of the baseball, a factual description 164 of the baseball, and an expert appraisal 166 to attest to the veracity and the value of the baseball. The expert appraisal 166 may be supplied by the qualified participant/seller 110, or the qualified participant/seller 110 may elect to use an expert appraisal 166 service offered by the present inventive device. The expert appraisal 166 comprises at least one of the group of a JPEG 186, or a video clip 163, or a text description 164, or an audio clip 165. The qualified participant/seller 110 uploads the auction item information 161 from the remote computer 10 to the host computer server 30.

Upon completion of selecting and uploading the auction item information, 161, the qualified participant/seller 110 must select an auction environment 175 and select an auctioneer 180 of choice. With respect to the auction environment 175, the present inventive device offers a variety of auction environments 175, such as a marina, a retail store, a park, a stadium, or a traditional auction stage. Said auction environments 175 are a virtual creation as is the auctioneer 180. The purpose of multiple auction environments 175 is to provide an auction backdrop that is appropriate to the item being auctioned, thereby showcasing the auction item and maximizing the potential value of the item being sold.

Upon selection of the desired auction environment 175, the qualified participant/seller 110 selects an auctioneer 180 of choice. "Auctioneer of choice" 180 denotes the option of the qualified participant/seller 110 having the choice to select a particular auctioneer 100 to conduct the auction. The present invention envisions not a single animated auctioneer 100 type or caricature, but multiple auctioneer 100 types or caricatures; each with a distinct personality and characteristics. By way of analogy: Consider an animated or cartoon show that typically comprises a host of characters, such as the Flintstones, whereby there exist a cast of characters: Barney, Fred, Wilma, and Betty, each of whom would present a separate, animated auctioneer 100 type with a unique look and personality. The present inventive device envisions that auction participants 110 will come to associate with a particular auctioneer 100 character, much in the way one has a favorite animated cartoon character, movie star, or musician. The cast of possible auctioneer types 180 is limitless; said auctioneer types 180 are virtual simulations of at least one of a group of famous movie stars, sports figures, musicians, politicians, writers, celebrities, historical figures, or unique characters created by the inventive device.

In the preferred embodiment, the animated auctioneer 100 is a virtual creation of the host computer 30. The animated auctioneer 100 further comprises varied multi-media data and functions mimicking a real-life auctioneer. Irrespective of the auctioneer character type 180, the auctioneer 100 is a multi-media representation; said multi-media auctioneer 100 comprising at least one of the group of audio, visual, textual, graphical, or electronic data, or any combination thereof. In another embodiment the animated auctioneer 100 conducts the auction 90 in conjunction with another animated personality, perhaps a second animated electronic auctioneer 100, or an animated sidekick. In this embodiment, the second animated character acts as a catalyst for the auctioneer 100.

Upon selection of the auctioneer of choice 180, the qualified participant/seller 110 selects the auctioneer options 185. The auctioneer options 185 available are the type 186 of auctioneer 180, the language 187 the auctioneer 100 is to use (English, German, Japanese, etc), the movement 188 the auctioneer 100 is to use, particular elements of speech 189 the auctioneer 100 is to use, and the appearance 190 of the auctioneer 100. Regarding the foregoing, the present inventive device offers the qualified participant/seller 110 choices regarding how the auctioneer of choice 180, looks 190, sounds 189, and acts 188. The type 186 of the auctioneer 100 is dependent on the auctioneer type 180 selected by the qualified participant/seller 110. By way of example, the qualified participant/seller 110 may select "Elvis" as an animated auctioneer 100. The qualified participant/seller 110 further customizes the Elvis auctioneer by selecting English as the language 187 the auction is to be conducted in, stage movements 188 reminiscent of Elvis, speech 189 traditionally associated with Elvis, such as "Thank you very much", or "Love me Tender", and the appearance 190 of Elvis, such as a young rock and roll Elvis or the elder Las Vegas Elvis. The auctioneer options 185 are varied and multiple, thereby giving the qualified participant/seller 110 a variety of auctioneer options 185 to select from. The qualified participant/seller 110 may further elect to upload patterns of speech 189 to the host computer 30 for the auctioneer 100 to use from the remote computer. After finalizing the auctioneer options 185, the qualified participant/seller 110 selects the start time and date 195 for the auction 90. Upon receipt of the qualified participant/seller 110 listing of the item for sale, said host computer 30 emails the qualified participant/seller 110 confirmation of the confirmed auction listing. Said host computer 30 further posts the item for auction 90 in the electronic auction catalogue 131.

CONCLUSIONS, SCOPE, AND RAMIFICATIONS OF THE PRESENT INVENTION

The Virtual Animated Auctioneer

Use of the multi-media animated auctioneer is proprietary to the present inventive device. Existing methods of on-line auctions do not utilize an auctioneer, per say. Rather the item is auctioned by placing a picture and a description of the item for sale on a static webpage, per the method utilized by popular on-line auctions such as eBay and Yahoo. The use of an animated auctioneer as an active participant to conduct the auction fundamentally changes the auction process from existing methods which rely on static postings as a means of facilitating the auction. The animated auctioneer is the conductor so to speak, the one responsible for initiating the auction process, soliciting bids, and concluding the auction.

A Live On-Line Auction

The on-line auction of the present inventive device is a live auction in the true sense of the traditional auction. The method of the present inventive device teaches an on-line auction with a fixed start time and real-time bid competition until there is a cessation in bidding, at which time the animated auctioneer moves to close the auction. The animated auctioneer is responsible for offering goods real-time and for a limited time, said time being when the bidding ceases. Existing methods of on-line auction, such as eBay and Yahoo, are not live auctions in the traditional sense of auction. Rather, existing methods rely on a static posting of goods whereby the seller selects a start time and date and a closing date. These parameters are not negotiable, rather they serve to function as a window of time where a potential buyer may input a bid. The static posting of goods with a predetermined start time and a predetermined finish time is not a "live" auction by any means. As put forth, the only live connotation is the submission of bids that are updated as close to real-time as possible and posted for viewers to see.

Real Time Bid Input and Real Time Bid Acceptance

The rapid-fire, competitive, successive, and immediate bid input is vital to a live auction. The method of the present inventive device teaches real-time bid input and real-time bid acceptance by the auctioneer. The auction input device inputs the bid real-time directly to the auction and the bid is broadcast real-time to the user interface of the inventive device. The animated auctioneer further acknowledges the real-time bid input by audibly announcing the bid input to the auction audience. The prior art fails to teach real-time bid input from a plurality of users and real-time bid acceptance from the auction. Rather, methods such as eBay and Yahoo teach a bid process whereby a user submits a number (bid) to the auction through a series of web pages whereby the user must constantly refresh the browser of their computer system for confirmation of acceptance of a bid and a bid status. Hence there exist lapses in time between bid submission, and bid acceptance, and bid status.

Interactive Method of Auction

The method of the present invention teaching real time bid input, a live auction, and the use of an auctioneer function to create a truly interactive auction. Existing methods of on-line auctions fail to replicate the atmosphere of a traditional auction whereby an auctioneer solicits bids from a plurality of participants who in turn bid openly, competitively, simultaneously, and successively among one another real-time. Existing models of on-line auction are highly impersonal, and less than exciting because there is no sense of rapid-fire competition among auction participants. There exists no true interaction among participants other than a status update on the graphic user interface. As noted above, the prior art teaches a bid process whereby a bidder submits bids that are validated by constantly reloading/refreshing one's browser. Thus, the only sense of interactive competition is reloading one's browser to see what the status of the prevailing bid is. The method of the present invention teaches an auction input device that allows immediate and constant interaction with the auctioneer, real time, and with other auction participants.

In view of the foregoing disadvantages inherent in the known types of on-line auctions, the present invention provides a new method of live on-line auction using an animated auctioneer, whereby a plurality of participants bid openly, competitively, simultaneously, and successively among one another. In this respect, the method of on-line auction according to the present invention substantially departs from the conventional concepts and designs of the prior art, and in so doing provides an apparatus primarily developed for the purpose of conducting an on-line live method of auction, using an auctioneer, whereby a plurality of participants bid openly, competitively, simultaneously, and successively among one another.

As to a further discussion of the manner of usage and operation of the present invention, the same should be apparent from the above description. Accordingly, no further discussion relating to the manner of usage and operation will be provided. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. A system for conducting an online auction, comprising:
at least one server accessible by a user with a local computer; and,
auction software stored on a computer readable medium and executable by said at least one server;
said auction software allowing a seller in communication with said at least one server to:
determine an auction category for an auction item;
determine a visual representation of said auction item;
determine a type of simulated representation of an auctioneer selected from a plurality of types of simulated representations of an auctioneer;
determine a virtual environment from a plurality of virtual auction environments for display on said local computer; said virtual environment providing an auction backdrop to showcase said auction item by said simulated representation of an auctioneer;
conduct a real-time auction with said simulated representation of an auctioneer by soliciting bids from said user; said soliciting bids from said user comprising movement of said simulated representation of said auctioneer and speaking dialog to said user via said local computer;

transmit real-time auction information between said local computer and said at least one server;
determine a winning bid for said auction item and end said real-time auction.

2. The system of claim 1, wherein said determine a type of simulated representation of an auctioneer selected from a plurality of types of simulated representations of an auctioneer further comprises determine characteristics of said simulated representation of said auctioneer associated with a business brand of said seller.

3. The system of claim 2, wherein said determine a virtual environment from a plurality of virtual auction environments for display on said local computer further comprises determine characteristics of said virtual environment associated with a business brand of said seller.

4. The system of claim 1, wherein said determine a virtual environment from a plurality of virtual auction environments for display on said local computer further comprises determine characteristics of said virtual environment associated with a business brand.

5. The system of claim 1, wherein said determine a type of simulated representation of an auctioneer selected from a plurality of types of simulated representations of an auctioneer further comprises determine a language spoken by said simulated representation of an auctioneer.

6. The system of claim 1, wherein said determine a type of simulated representation of an auctioneer selected from a plurality of types of simulated representations of an auctioneer further comprises determine a movement, element of speech and appearance of said simulated representation of an auctioneer.

7. A system for conducting an online auction, comprising:
at least one server accessible by a user with a local computer; and,
auction software stored on a computer readable medium and executable by said at least one server;
said auction software allowing a seller in communication with said at least one server to:
determine an auction category for an auction item;
determine a visual representation of said auction item;
determine a type of simulated representation of an auctioneer selected from a plurality of types of simulated representations of an auctioneer;
determine brand characteristics of said simulated representation of said auctioneer associated with a business of said seller;
conduct a real-time auction with said simulated representation of an auctioneer by soliciting bids from said user; said soliciting bids from said user comprising movement of said simulated representation of said auctioneer and speaking dialog to said user via said local computer;
transmit real-time auction information between said local computer and said at least one server;
determine a winning bid for said auction item and end said real-time auction.

8. The system of claim 7, wherein said auction software further allows said seller in communication with said at least one server to determine a virtual environment from a plurality of virtual auction environments for display on said local computer; said virtual environment providing an auction backdrop to showcase said auction item by said simulated representation of an auctioneer.

9. The system of claim 8, wherein said determine a virtual environment from a plurality of virtual auction environments for display on said local computer further comprises determine brand characteristics of said virtual environment associated with a business of said seller.

10. The system of claim 9, wherein said determine a type of simulated representation of an auctioneer selected from a plurality of types of simulated representations of an auctioneer further comprises determine movements, language spoken, elements of speech and appearance of said simulated representation of an auctioneer.

11. The system of claim 7, wherein said auction software further allows said seller in communication with said at least one server to upload patterns of speech to said server for use by said simulated representation of an auctioneer.

12. The system of claim 7, wherein said auction software further allows said seller in communication with said at least one server to determine an appraisal of said auction item by an expert for displaying during said real-time auction.

13. A system for conducting an online auction, comprising:
at least one server accessible by a user with a local computer; and,
auction software stored on a computer readable medium and executable by said at least one server;
said auction software allowing a seller in communication with said at least one server to:
determine an auction category for an auction item;
determine a visual representation of said auction item;
determine a type of simulated representation of an auctioneer selected from a plurality of types of simulated representations of an auctioneer;
upload patterns of speech to said server for use by said simulated representation of an auctioneer during a real-time auction;
conduct said real-time auction with said simulated representation of an auctioneer by soliciting bids from said user; said soliciting bids from said user comprising movement of said simulated representation of said auctioneer and speaking said uploaded patterns of speech to said user via said local computer;
transmit real-time auction information between said local computer and said at least one server;
determine a winning bid for said auction item and end said real-time auction.

* * * * *